(12) United States Patent
Shaw

(10) Patent No.: US 7,820,121 B2
(45) Date of Patent: Oct. 26, 2010

(54) DESTRUCTION OF ORGANICS IN BAYER PROCESS STREAMS

(76) Inventor: Raymond Walter Shaw, 514 Rathdowne Street, Carlton North, VIC 3054 (AU)

( * ) Notice: Subject to any disclaimer, the term of this patent is extended or adjusted under 35 U.S.C. 154(b) by 706 days.

(21) Appl. No.: 10/595,484

(22) PCT Filed: Oct. 22, 2004

(86) PCT No.: PCT/AU2004/001458

§ 371 (c)(1), (2), (4) Date: May 9, 2007

(87) PCT Pub. No.: WO2005/040042

PCT Pub. Date: May 6, 2005

(65) Prior Publication Data

US 2008/0069747 A1    Mar. 20, 2008

(30) Foreign Application Priority Data

Oct. 22, 2003    (AU) ............................. 2003905823

(51) Int. Cl.
*C01F 7/00*    (2006.01)
(52) U.S. Cl. ...................... 423/121; 423/127; 423/625; 588/304; 588/405
(58) Field of Classification Search ................ 423/121, 423/127, 625; 588/304, 405–409
See application file for complete search history.

(56) References Cited

U.S. PATENT DOCUMENTS

| 4,062,696 | A | 12/1977 | Ducote |
| 6,335,396 | B1 | 1/2002 | Chevallier et al. |
| 6,391,277 | B1 * | 5/2002 | El Kadi et al. ............. 423/629 |

FOREIGN PATENT DOCUMENTS

| BR | 9701866 | * | 1/1999 |
| CN | 1072214 | | 5/1993 |
| SU | 430060 | * | 10/1974 |
| WO | WO 89/05184 | | 6/1989 |

OTHER PUBLICATIONS

McGrath et al., "Sonochemical technology for processing bauxite" JOM, Minerals Metals and Materials Society, 50 (5), May 1998, pp. 34-37.*
International Search Report of International Application No. PCT/AU2004/001458; 2 pages; dated Dec. 20, 2004.

* cited by examiner

*Primary Examiner*—Steven Bos
(74) *Attorney, Agent, or Firm*—Fish & Richardson P.C.

(57) ABSTRACT

A Bayer process is disclosed. The Bayer process includes a step of treating any one or more of: (a) Bayer liquor or liquors produced in the process, (b) precipitated aluminium trihydrate particles produced in the process, and (c) other solids added to or produced in the process, with ultrasonic energy and destroying organics in the liquor or liquors, on the precipitated aluminium trihydrate particles, and on the other solids.

31 Claims, 1 Drawing Sheet

DESTRUCTION OF ORGANICS IN BAYER PROCESS STREAMS

Figure 1:
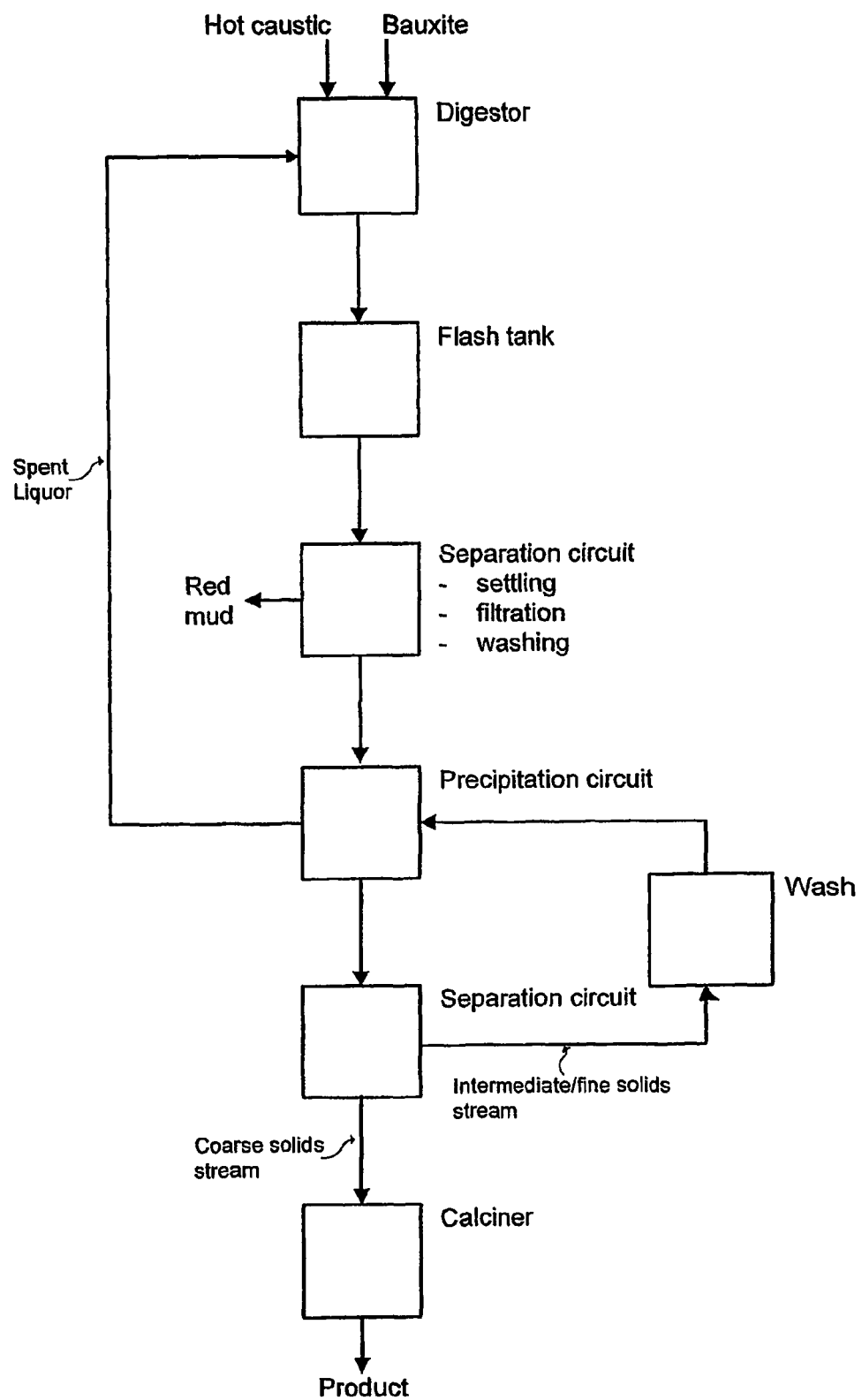

The present invention relates to destroying organic compounds, hereinafter referred to as "organics", in Bayer process streams.

The Bayer process is the dominant technology for extracting refined alumina from alumina process feedstocks.

In the Bayer process alumina is extracted from alumina process feedstock (most frequently in the form of bauxite) by digesting milled feedstock in hot caustic solution, generally under pressure. If the alumina process feedstock contains mainly gibbsite (a mineral form of alumina trihydrate), extraction of alumina from the bauxite may be conducted using a caustic solution at a temperature generally in the range 100 to 175° C. If the alumina process feedstock contains commercially important amounts of boehmite or diaspore (mineral forms of aluminium monohydrate), higher temperatures, of the order of 200 to 300° C. are generally required.

After digestion, the solid residue/pregnant caustic liquor mixture is brought back to atmospheric pressure by flashing to boil off water. The solid residue (usually referred to as red mud) is separated from the pregnant, caustic aluminate bearing liquor, usually by a combination of settling or filtration and washing, with both pregnant liquor and wash liquor being clarified through pressure filters.

The clarified combined liquor is fed to a precipitation circuit where it is cooled and seeded with solid particles of alumina trihydrate to induce precipitation of solid aluminium trihydrate crystals from the liquor.

The resulting precipitation slurry is separated into a spent liquor stream and separate solids streams graded by particle size, by settling, cycloning or filtration, or combination of these processes.

Coarse solids represent product, and are washed and transferred to a calcination stage where they are calcined to produce alumina.

Intermediate and fine solids are separately returned as seed to the precipitation circuit, frequently after at least crude de-liquoring, e.g. in cyclones or filters, for agglomeration and to provide seed.

The intermediate and fine seed are normally washed prior to recycle to the precipitation circuit, either to remove solid phase oxalate precipitated with the alumina (which would interfere with the incorporation of the fine material into composite coarse particles in the precipitation process) and/or to remove organics which would otherwise render the seed less active.

The spent liquor is returned to the digestion step, normally after some reconcentration by evaporation, where it is contacted with further milled alumina process feedstock.

In general terms, the above-described Bayer process can be summarised as a process which comprises the basic steps of (a) digesting alumina process feedstocks in sodium hydroxide; (b) precipitating aluminium trihydrate from a process stream produced in step (a); and (c) calcining the precipitate to produce alumina, and may include further steps in addition to steps (a), (b), and (c).

The liquors produced in step (a) and the subsequent steps are hereinafter referred to generally as "Bayer liquors".

The Bayer process has been used commercially for about 100 years and is well known to persons skilled in the art.

A major problem with all Bayer plants is the build up of harmful organics in Bayer liquors.

Harmful organics originate from contamination in the bauxite ore mined, such as from plant and animal matter, and under the high temperatures and strongly alkaline conditions of the bauxite digestion step these organics enter Bayer liquors.

A wide range of organics are present, especially humates.

Humates reduce the productivity of Bayer plants through contaminating the surfaces of precipitated aluminium trihydrate crystals and slowing down the crystallization rates. Humates and similar compounds do break down in the circuit into lower molecular weight, less harmful compounds but the rate of this breakdown is slow and not sufficient to avoid a significant build up of the organics to harmful levels within the process liquors.

A number of processes have been proposed to remove these organics. Liquor burning and wet oxidation are the most favoured processes. These are both expensive and have severe disadvantages in either only removing some of the organics (wet oxidation) or in having difficulties with unwanted emissions of part oxidized species (liquor burning).

The present invention is based on the realisation that the use of ultrasonic energy is an alternative option for removing organics from any one or more of (a) Bayer liquor or liquors, (b) precipitated aluminium trihydrate particles produced in the process and (c) other solids added to or produced in the process.

The term "ultrasonic energy" is understood herein to mean sound waves at a frequency of more than approximately 15,000 Hz.

Accordingly, the present invention provides a Bayer process, as described above, which includes treating any one or more of: (a) Bayer liquor or liquors produced in the process, (b) precipitated aluminium trihydrate particles produced in the process, and (c) other solids added to or produced in the process, with ultrasonic energy and destroying organics in the liquor or liquors, on the precipitated aluminium trihydrate particles, and on the other solids.

The term "destroying" is understood herein to include total destruction resulting in the production of $CO_2$ and partial destruction involving converting organics from their original form into another form that has a less serious impact on the Bayer process and product.

The above-described treatment step may be carried out on a Bayer liquor or liquors and/or precipitated aluminium trihydrate particles from any part of the Bayer process.

In addition, the above-described treatment step may be carried out on side streams of the Bayer liquor or liquors from any part of the Bayer process.

The treatment step is advantageously carried out on Bayer liquors and/or precipitated aluminium trihydrate particles and/or other solids that have relatively high concentrations of organics compared to other Bayer liquors and particles.

Suitable precipitated aluminium trihydrate particles include intermediate and fine particles that are separated from a precipitation slurry from a precipitation step of the Bayer process. These particles are particles that are returned to the precipitation step as seed particles, and hereinafter are referred to as "seed particles".

The seed particles have relatively high concentrations of organics attached to the surfaces of the particles. It is important to wash organics off the particles before returning the particles to the precipitation step. Washing is necessary to improve the activity of the particles in agglomeration and in further growth of particles. Washing is a critical part of maintaining control of the particles size within the precipitation circuit and in maximising the overall precipitation of alumina trihydrate from Bayer liquor.

The practice of most Bayer plants is to wash off organics from the surfaces of seed particles and recycle the wash liquor, which is high in organics, back into the process to avoid losing the contained valuable sodium hydroxide and aluminium. This recycle stream does not provide an outlet for organic contaminants unless part or all of the stream is deliberately discarded—which can be the case if the penalties due to the presence of high organic concentrations are more severe than the cost of losing the sodium hydroxide and alumina in the wash liquor.

Treating seed particles prior to washing organics from the surfaces of the particles and/or from the resultant wash liquor in a suitable ultrasonic unit allows destruction of the harmful organics and avoids the need to discharge valuable liquor. The valuable liquor can be returned to any suitable part of the Bayer process.

With this method more organics destruction and hence removal from the circuit can be achieved on an economic basis than is possible using conventional treatment and discharge of the wash liquor. Specifically, the method is much simpler and more economical than the use of wet oxidation or liquor burning.

The other solids may include a suitable collector material for organics, whereby organics attach to the surface of the collector material.

The treatment step may include separating the collector material with attached organics from the Bayer liquor or liquors into a side stream and treating the side stream with ultrasonic energy and destroying organics on the collector material.

The treatment step may result in regeneration of the collector material or may include a separate step of regenerating the collector material.

In either case, treatment step may include reusing the collector material in the process to collect more organics for ultrasonic energy treatment.

The collector material may be any suitable material and be in any suitable form to facilitate attachment of organics to the material and, where appropriate, separation of collector material from Bayer liquor.

Suitable collector materials include, by way of example, resins and activated carbon.

Suitable forms of the collector materials include, by way of example, particles or beads.

Preferably the particles or beads of collector material are sufficiently large to be readily separated from Bayer liquor.

By way of example, the collector material may be a material that has a higher density than Bayer liquor to facilitate separation from Bayer liquor by settling.

By way of example, the collector material may be a material that has a lower density than Bayer liquor and/or be hydrophobic to facilitate separation from Bayer liquor by flotation.

By way of example, the collector material may be a material that can be separated magnetically. This can allow finer collector particles to be used in conjunction with a magnetic collection device such as a high gradient magnetic separator or a "magnetic filter". One specific collector material of this type is fine particles prepared by applying an organic/polymer coating onto fine precipitated iron containing particles.

Preferably the ultrasonic energy is of sufficiently high energy that it causes cavitation in Bayer liquor or at the surface of the particles.

The ultrasonic energy may be applied continuously or in short, preferably high energy, pulses depending upon the properties of the organics and the particles and upon the design of the equipment.

The term "cavitation" is understood herein to mean the formation of bubbles that grow and implosively collapse in the liquor or at the particle surface thereby producing intense localised heating and high pressures and high heating and cooling rates that cause chemical and physical reactions within the region of the collapsed bubbles.

The above-described chemical and physical reactions within the regions of the collapsed bubbles cause the destruction of organics in those regions.

FIG. 1 is a flowsheet illustrating a Bayer process.

The present invention is described further by way of example with reference to the accompanying flowsheet of the main process steps in a standard Bayer process.

With reference to the flowsheet, bauxite and hot caustic are supplied to a digestor operating under a suitable pressure and alumina is extracted from the bauxite.

The solid residue/pregnant caustic liquor mixture produced in the digestor is transferred to a flash tank and brought back to atmospheric pressure by flashing to boil off water. Red mud is separated from the pregnant, caustic aluminate bearing liquor, usually by a combination of settling or filtration and washing, with both pregnant liquor and wash liquor clarified through pressure filters.

The clarified combined liquor is fed to a precipitation circuit where it is cooled and seeded with solid particles of alumina trihydrate to induce precipitation of solid aluminium trihydrate crystals from the liquor.

The resulting precipitation slurry is transferred to a separation circuit and separated into a spent liquor stream and separate solids streams graded by particle size, by settling, cycloning or filtration, or combination of these processes.

Coarse solids represent product, and are washed and transferred to a calciner where they are calcined to produce alumina.

Intermediate and fine solids are separately returned as seed particles to the precipitation circuit. Specifically, the intermediate and fine seed are washed prior to being returned to the precipitation circuit. The wash liquor, which contains organics and valuable caustic, is discharged as a waste product.

The spent liquor is returned to the digestor, normally after some reconcentration by evaporation, where it is contacted with further bauxite.

There are a number of opportunities in the above-described Bayer process for destroying organics in Bayer liquor or liquors and/or on particles in Bayer liquors in accordance with the present invention, ie by exposing the Bayer liquor or liquors and/or on particles in Bayer liquors to ultrasonic energy.

By way of example, the intermediate and fine solids from the separation circuit is one option of a Bayer liquor with entrained particles that is suitable to be treated with ultrasonic energy before the solids are returned as seed particles to the precipitation circuit. The treatment may be prior to or after the washing step. In the case of treatment after the washing step, the washed solids are separated from the wash liquor and transferred to the precipitation circuit and the wash liquor is exposed to ultrasonic energy. The treated wash liquor, with its valuable caustic, is suitable to be used in any part of the Bayer process.

By way of further example, another option is to treat a side stream of Bayer liquor from any part of the process with ultrasonic energy.

By way of further example, another option is to add a suitable collector of organics to a Bayer liquor or liquors and thereafter treat the liquor or liquors with ultrasonic energy or separating the collector material with attached organics into a side stream and then treating the side stream with ultrasonic energy. The wash stream arising from washing fine and/or intermediate solids is particularly amenable to the addition of suitable collector particles to collect the organics present, with the particles then being separated and treated with ultrasonics to destroy the collected organics.

There are a large number of collector material separation options including, by way of example, particle size, differences in density, hydrophobicity, and magnetic properties.

The ultrasonic energy may be of any suitable power, frequency, and wavelength. The ultrasonic energy may be continuous or pulsed.

Many modifications may be made to the present invention described above without departing from the spirit and scope of the invention.

The invention claimed is:

1. A Bayer process, comprising treating any one or more of: (a) Bayer liquor or liquors produced in the process, (b) precipitated aluminium trihydrate particles produced in the process, and (c) other solids added to or produced in the process, with ultrasonic energy to destroy organics in the liquor or liquors, on the precipitated aluminium trihydrate particles, and on the other solids.

2. The process of claim 1 wherein the treatment step is carried out on a Bayer liquor or liquors and/or precipitated aluminium trihydrate particles from any part of the Bayer process.

3. The process of claim 1 wherein the treatment step is carried out on side streams of the Bayer liquor or liquors from any part of the Bayer process.

4. The process of claim 1 wherein the treatment step is carried out on a portion of the Bayer liquor or liquors and/or precipitated aluminium trihydrate particles and/or other solids that have relatively high concentrations of organics compared to other portions of the Bayer liquors and particles in the process.

5. The process of claim 1 wherein the precipitated aluminium trihydrate particles are intermediate and fine seed particles that are separated from a precipitation slurry from a precipitation step of the Bayer process.

6. The process of claim 1 wherein the other solids is a collector material for organics.

7. The process of claim 6 wherein the treatment step includes separating the collector material with attached organics from the Bayer liquor or liquors into a side stream and treating the side stream with ultrasonic energy to destroy organics on the collector material.

8. The process of claim 7 wherein the treatment step includes regenerating the collector material for reuse in the process to collect more organics for ultrasonic energy treatment.

9. The process of claim 6 wherein the collector material includes resins and activated carbon.

10. The process of claim 6 wherein the collector material includes particles or beads of collector material.

11. The process of claim 10 wherein the particles or beads of collector material are sufficiently large to be readily separated from Bayer liquor.

12. The process of claim 6 wherein the collector material is a material that has a higher density than Bayer liquor to facilitate separation from Bayer liquor by settling.

13. The process of claim 6 wherein the collector material is a material that has a lower density than Bayer liquor and/or is hydrophobic to facilitate separation from Bayer liquor by flotation.

14. The process of claim 6 wherein the collector material is a material that can be separated magnetically.

15. The process of claim 14 wherein the collector material includes fine particles prepared by applying a coating onto fine precipitated iron containing particles.

16. The process of claim 1 wherein the treatment step includes treating the Bayer liquor or liquors and/or precipitated aluminium trihydrate particles and/or other solids with ultrasonic energy of sufficiently high energy that the ultrasonic energy causes cavitation in Bayer liquor or at the surface of the particles.

17. The process of claim 1 wherein the treatment step includes treating the Bayer liquor or liquors and/or precipitated aluminium trihydrate particles and/or other solids with a continuous stream of ultrasonic energy or pulses of ultrasonic energy.

18. A Bayer process, comprising treating Bayer liquor or liquors produced in the process with ultrasonic energy to destroy organics in the liquor or liquors.

19. A Bayer process, comprising treating precipitated aluminium trihydrate particles produced in the process with ultrasonic energy to destroy organics on the particles.

20. A Bayer process, comprising treating a collector material for organics added to the process with ultrasonic energy to destroy organics on the collector material.

21. A Bayer process comprising a treatment step for seed particles of aluminium trihydrate particles that have been separated from a precipitation slurry produced in a precipitation step in the process and are transferred to the precipitation step, with the treatment step comprising treating seed particles or a wash solution produced after washing the seed particles with ultrasonic energy to destroy organics.

22. A Bayer process comprising a treatment step for solids, other than precipitated aluminium trihydrate particles, that are added to or produced in the process and are a collector material for organics, with the treatment step comprising treating the collector material with ultrasonic energy to destroy organics on the collector material.

23. The process of claim 22 wherein the treatment step includes separating the collector material with attached organics from the Bayer liquor or liquors into a side stream and treating the side stream with ultrasonic energy to destroy organics on the collector material.

24. The process of claim 23 wherein the treatment step includes regenerating the collector material for reuse in the process to collect more organics for ultrasonic energy treatment.

25. The process of claim 22 wherein the collector material includes resins and activated carbon.

26. The process of claim 22 wherein the collector material includes particles or beads of collector material.

27. The process of claim 26 wherein the particles or beads of collector material are sufficiently large to be readily separated from Bayer liquor.

28. The process of claim 22 wherein the collector material is a material that has a higher density than Bayer liquor to facilitate separation from Bayer liquor by settling.

29. The process of claim 22 wherein the collector material is a material that has a lower density than Bayer liquor and/or is hydrophobic to facilitate separation from Bayer liquor by flotation.

30. The process of claim 22 wherein the collector material is a material that can be separated magnetically.

31. The process of claim 30 wherein the collector material includes fine particles prepared by applying a coating onto fine precipitated iron containing particles.

* * * * *